(12) United States Patent
Kim (10) Patent No.: US 9,623,853 B2
(45) Date of Patent: Apr. 18, 2017

(54) BRAKE DEVICE AND METHOD FOR VEHICLE

(71) Applicant: HYUNDAI MOBIS CO., LTD., Seoul (KR)

(72) Inventor: Jong Sung Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 62 days.

(21) Appl. No.: 14/660,725

(22) Filed: Mar. 17, 2015

(65) Prior Publication Data
US 2015/0307070 A1    Oct. 29, 2015

(30) Foreign Application Priority Data
Apr. 25, 2014  (KR) .................. 10-2014-0049978

(51) Int. Cl.
| | |
|---|---|
| *B60T 13/58* | (2006.01) |
| *B60T 7/04* | (2006.01) |
| *B60T 8/40* | (2006.01) |
| *B60T 8/52* | (2006.01) |
| *B60T 8/26* | (2006.01) |
| *B60T 8/48* | (2006.01) |

(52) U.S. Cl.
CPC .............. *B60T 13/58* (2013.01); *B60T 7/042* (2013.01); *B60T 8/4081* (2013.01); *B60T 8/52* (2013.01); *B60T 8/267* (2013.01); *B60T 8/4872* (2013.01)

(58) Field of Classification Search
CPC ........ B60T 13/66; B60T 13/58; B60T 8/4081; B60T 13/74; B60T 8/34
USPC ........ 303/3, 10, 11, 115.4, 116.2; 188/106 P
See application file for complete search history.

(56) References Cited

U.S. PATENT DOCUMENTS

| | | | |
|---|---|---|---|
| 8,104,589 B2 | 1/2012 | Ollat et al. | |
| 8,490,758 B2 | 7/2013 | Ollat et al. | |
| 2011/0254358 A1* | 10/2011 | Strengert ............. | B60T 1/10 303/3 |
| 2012/0074767 A1* | 3/2012 | Nishio ................ | B60T 1/10 303/3 |

FOREIGN PATENT DOCUMENTS

| | | |
|---|---|---|
| KR | 10-0347645 B1 | 11/2002 |
| KR | 10-2004-0092476 A | 11/2004 |
| KR | 10-2008-0088059 A | 10/2008 |
| KR | 10-2011-0065845 A | 6/2011 |
| KR | 10-2012-0000839 A | 1/2012 |

* cited by examiner

*Primary Examiner* — Melanie Torres Williams
(74) *Attorney, Agent, or Firm* — Knobbe Martens Olson & Bear LLP (57) ABSTRACT

A brake device for a vehicle may include: a master cylinder generating hydraulic pressure; a pedal pressurizing the master cylinder; a pair of diverging line parts connected to the master cylinder so as to supply hydraulic pressure; a front wheel line part connected to each of the diverging line parts so as to guide hydraulic pressure; a combined brake connected to the front wheel line part, and generating hydraulic pressure while braking a front wheel according to an electrical signal; a rear wheel line part connected to the front wheel line part so as to guide hydraulic pressure; and a hydraulic brake connected to the rear wheel line part, and braking a rear wheel using hydraulic pressure.

11 Claims, 5 Drawing Sheets

BRAKE DEVICE AND METHOD FOR VEHICLE

CROSS-REFERENCES TO RELATED APPLICATIONS

The present application claims priority to Korean application number 10-2014-0049978, filed on Apr. 25, 2014, which is incorporated by reference in its entirety.

BACKGROUND

The present disclosure relates to a brake device and method for a vehicle, and more particularly, to a brake device and method for a vehicle, which is capable of using an electromechanical system and a hydraulic system together, while braking front wheels in an electromechanical manner and braking rear wheels in a hydraulic manner.

In general, a brake device refers to a device which decelerates or stops a vehicle. Recently, an EMB (Electromechanical Brake) has been developed to replace an existing hydraulic brake system. The EMB includes a smaller number of parts than the hydraulic brake system, can be reduced in weight, and has excellent modularity. Furthermore, the EMB exhibits more excellent braking performance than the hydraulic brake system.

In the EMB, a hydraulic piping for guiding a hydraulic pump and hydraulic pressure can be replaced with an electric wire. Thus, the hydraulic piping made of a metallic material can be removed to reduce the weight of the vehicle.

The related art is disclosed in Korean Patent Laid-open Publication No. 2011-0065845 published on Jun. 16, 2011 and entitled "Brake system for a vehicle".

SUMMARY

Embodiments of the present invention are directed to a brake device and method for a vehicle, which is capable of using an electromechanical system and a hydraulic system together, while braking front wheels in an electromechanical manner and braking rear wheels in a hydraulic manner.

In one embodiment, a brake device for a vehicle may include: a master cylinder generating hydraulic pressure; a pedal pressurizing the master cylinder; a pair of diverging line parts connected to the master cylinder so as to supply hydraulic pressure; a front wheel line part connected to each of the diverging line parts so as to guide hydraulic pressure; a combined brake connected to the front wheel line part, and generating hydraulic pressure while braking a front wheel according to an electrical signal; a rear wheel line part connected to the front wheel line part so as to guide hydraulic pressure; and a hydraulic brake connected to the rear wheel line part, and braking a rear wheel using hydraulic pressure.

The brake device may further include a pedal simulator connected to the diverging line part, and providing a pedal force to the pedal.

The brake device may further include: an accumulator part connected to the diverging line part, the front wheel line part, and the rear wheel line part, and accumulating hydraulic pressure; and a motor pump connected to the front wheel line part so as to supply hydraulic pressure.

The diverging line part may include: a diverging supply part connected to the master cylinder; a diverging connection part connecting the diverging supply part and the front wheel line part; and a normal open valve mounted on the diverging connection part, and opening the diverging connection part in a state where no electrical signal is received.

The diverging line part may include: a diverging storage part connecting the diverging supply part and the accumulator part; and a normal closed valve mounted on the diverging storage part, and closing the diverging storage part in a state where no electrical signal is received.

When an electrical signal is received, the normal open valve may close the diverging connection part, and the normal closed valve may open the diverging storage part.

The front wheel line part may include: a front wheel guide part connecting the diverging line part and the combined brake; and a front wheel valve mounted on the front wheel guide part so as to open/close the front wheel guide part.

The rear wheel line part may include: a rear wheel guide part connecting the front wheel guide part and the hydraulic brake; a rear wheel valve mounted on the rear wheel guide part so as to open/close the rear wheel guide part; a rear wheel bypass part having both ends connected to the rear wheel guide part, and inducing hydraulic pressure to bypass the rear wheel valve; and a check valve mounted on the rear wheel bypass part, and allowing hydraulic pressure to flow only in one direction.

The accumulator part may include: an accumulator; a pump connection part connecting the motor pump and the accumulator; a diverging connection part connecting the diverging storage part and the accumulator; a front wheel connection part connecting the front wheel guide part and the accumulator; and a rear wheel connection part connecting the rear wheel guide part and the accumulator.

In another embodiment, a brake method for a vehicle may include: detecting whether a combined brake is normally operated, the combined brake serving to brake a front wheel through an electrical signal and hydraulic pressure; when the combined brake is normally operated, braking the front wheel through the combined brake receiving an electrical signal, and braking a rear wheel through a hydraulic brake using hydraulic pressure generated from the combined brake; detecting whether the front wheel and the rear wheel are in an ABS braking situation; and when the front wheel and the rear wheel are in the ABS braking situation, braking the front wheel through the combined brake receiving an electrical signal, and braking the rear wheel through the hydraulic brake using hydraulic pressure adjusted by a motor pump.

In the braking of the front wheel through the combined brake receiving the electrical signal and the braking of the rear wheel through the hydraulic brake using hydraulic pressure generated from the combined brake, the hydraulic pressure generated from the master cylinder may not be supplied to the combined brake or the hydraulic brake, but supplied only to a pedal simulator.

The brake method may further include, when the combined brake is abnormally operated, braking the front wheel through the combined brake using hydraulic pressure supplied from the master cylinder, and braking the rear wheel through the hydraulic brake.

In accordance with the embodiments of the present invention, the combined brake for braking the front wheel according to an electrical signal and the hydraulic brake for the rear wheel using hydraulic pressure can be used together during ABS (Anti-lock Braking system) or VDC (Vehicle Dynamic Control) control.

Furthermore, during CBS (Conventional Brake System) control, the brake for braking the front wheel can be used to actively control both of the front and rear wheels.

Furthermore, a pedal force for the pedal can be secured through the pedal simulator.

Furthermore, four-wheel braking can be performed through hydraulic pressure of the master cylinder during an emergency.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Generally, since the hydraulic piping is removed from a typical EMB, a braking operation would not be smoothly performed in case where an electric signal error or microcomputer operation error occurs. Furthermore, while the EMB is used for front wheels and a hydraulic caliper is used for rear wheels, a pedal force of a driver generates a braking force for the rear wheels, without using a pedal simulator. Thus, a front-wheel EMB-combined brake for forming a pedal feel may have difficulties in providing a satisfactory pedal feel to a user who is accustomed to the hydraulic brake system. Thus, there is a demand for a structure capable of improving such a problem.

Figure 1:
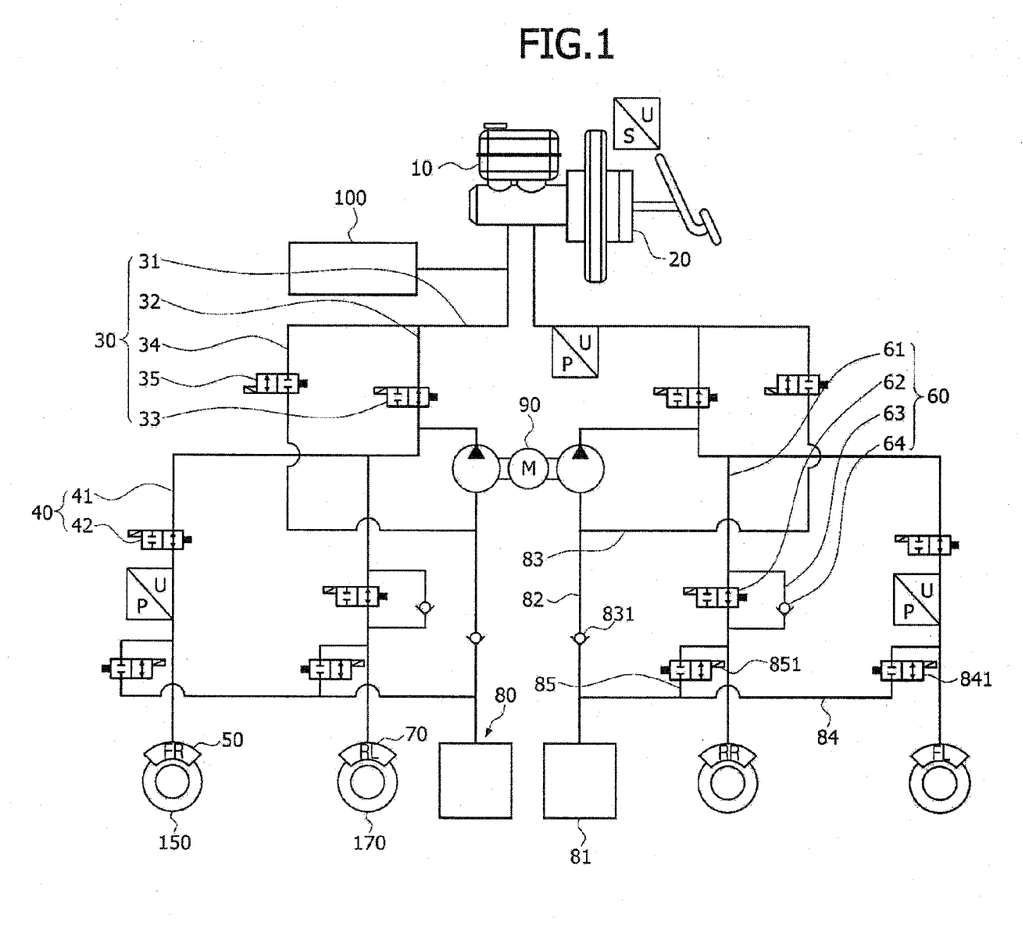
FIG. 1 is a diagram schematically illustrating a brake device for a vehicle in accordance with an embodiment of the present invention.
Figure 2:
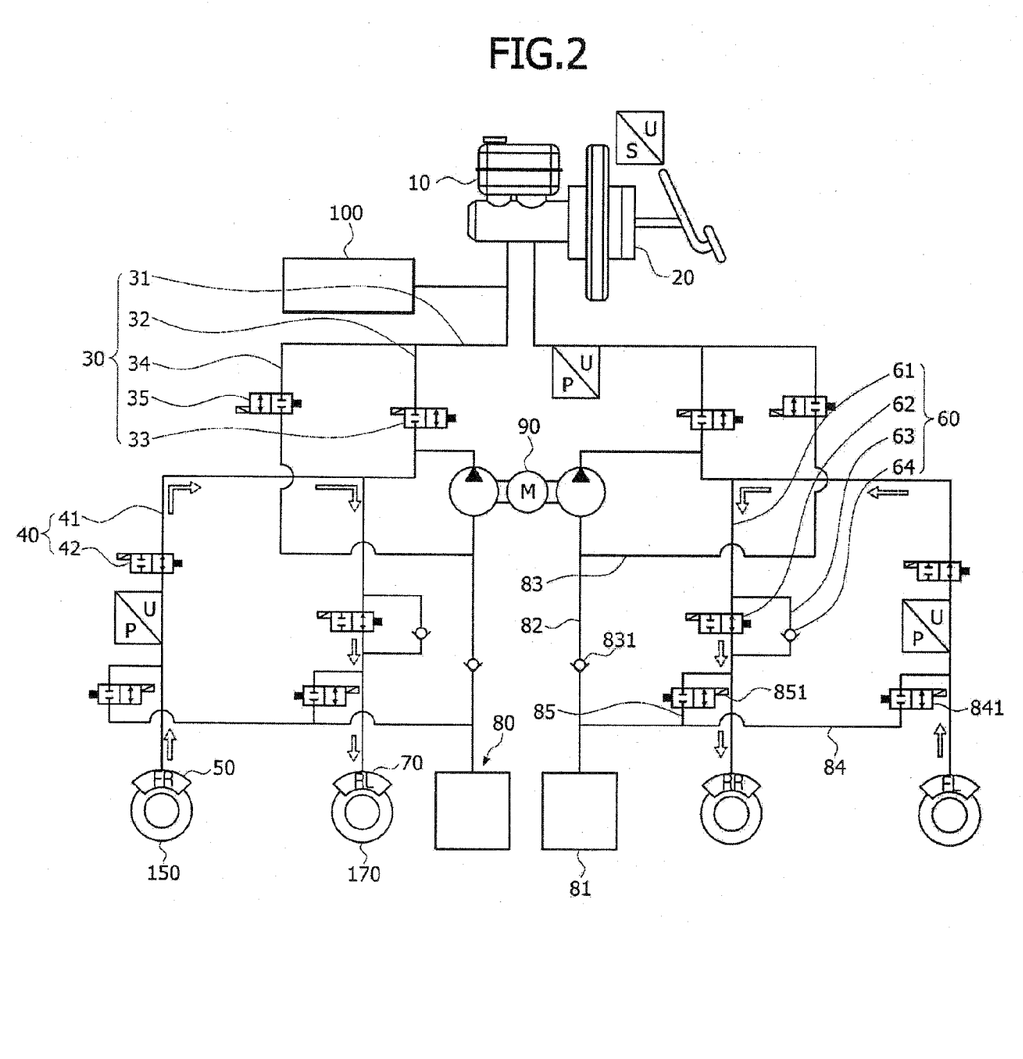
FIG. 2 is a diagram schematically illustrating that front and rear wheels are braked when a combined brake is in a normal state in the brake device for a vehicle in accordance with the embodiment of the present invention.
Figure 3:
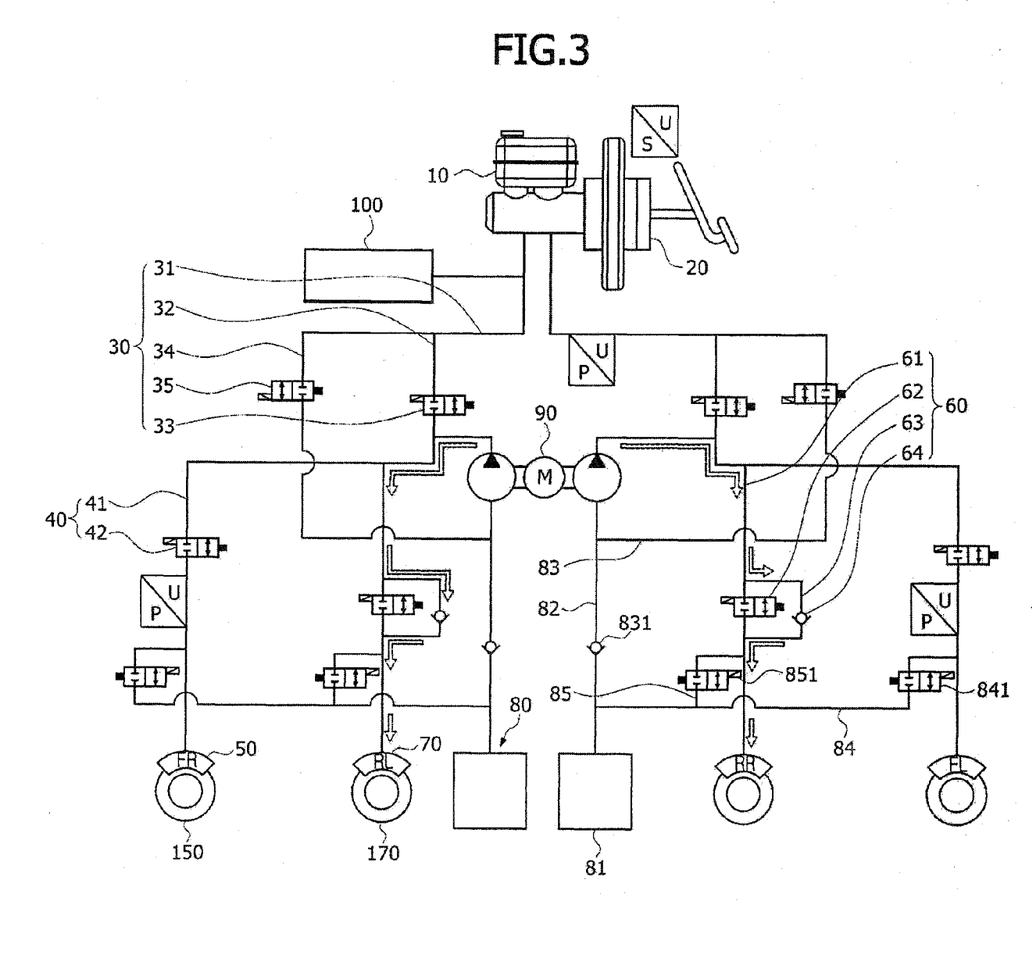
FIG. 3 is a diagram schematically illustrating that the front and rear wheels are braked in an ABS braking situation, when the combined brake is in a normal state in the brake device for a vehicle in accordance with the embodiment of the present invention.
Figure 4:
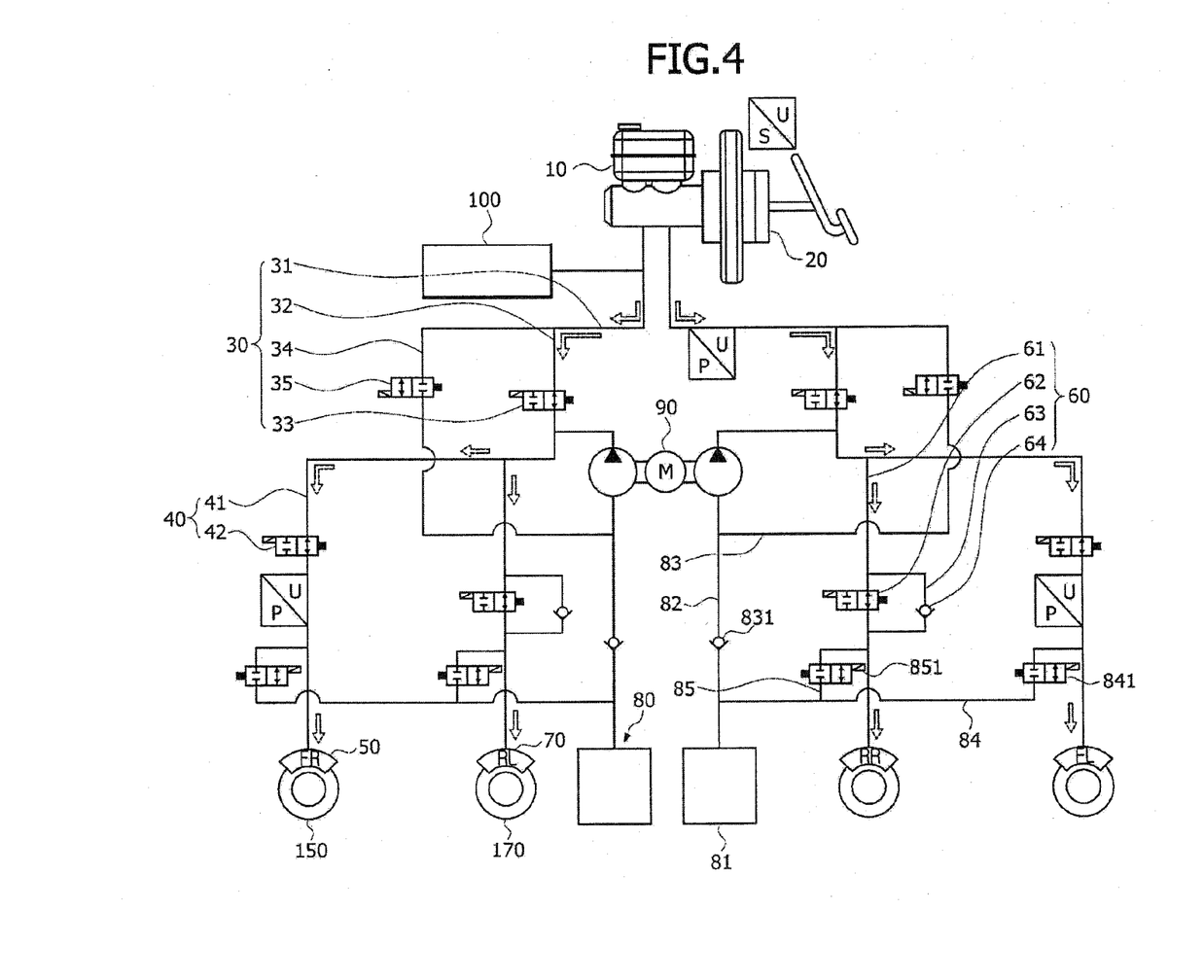
FIG. 4 is a diagram schematically illustrating that the front and rear wheels are braked when the combined brake is in an abnormal state in the brake device for a vehicle in accordance with the embodiment of the present invention.

FIG. 1 is a diagram schematically illustrating a brake device for a vehicle in accordance with an embodiment of the present invention. FIG. 2 is a diagram schematically illustrating that front and rear wheels are braked when a combined brake is in a normal state in the brake device for a vehicle in accordance with the embodiment of the present invention. FIG. 3 is a diagram schematically illustrating that the front and rear wheels are braked in an ABS braking situation, when the combined brake is in a normal state in the brake device for a vehicle in accordance with the embodiment of the present invention. FIG. 4 is a diagram schematically illustrating that the front and rear wheels are braked when the combined brake is in an abnormal state in the brake device for a vehicle in accordance with the embodiment of the present invention.

Referring to FIGS. 1 to 4, the brake device 1 for a vehicle in accordance with the embodiment of the present invention may include a master cylinder 10, a pedal 20, a diverging line part 30, a front wheel line part 40, a combined brake 50, a rear wheel line part 60, and a hydraulic brake 70.

The master cylinder 10 may be mounted on a vehicle body, and the pedal 20 may pressurize the master cylinder 10. For example, the pedal 20 may be positioned at the bottom of a driver's seat such that a driver can step on the pedal 20. Furthermore, when the pedal 20 pressurizes the master cylinder 10, hydraulic pressure in the master cylinder 10 may be amplified.

The diverging line part 30 may be connected to the master cylinder 10, and supply hydraulic pressure generated from the master cylinder 10. For example, the master cylinder 10 may have two chambers formed therein, and a pair of diverging line part 30 may be connected to the respective chambers so as to guide hydraulic pressure.

The front wheel line part 40 may be connected to the diverging line part 30 so as to guide hydraulic pressure, and the combined brake 50 may be connected to the front wheel line part 40. The combined brake 50 may mechanically brake a front wheel 150 according to a received electrical signal. The combined brake 50 may be connected to the front wheel line part 40, and supply hydraulic pressure to the front wheel line part 40 while braking the front wheel 150 according to the electrical signal. Furthermore, the combined brake 50 may brake the front wheel 150 using the hydraulic pressure provided through the front wheel line part 40.

The rear wheel line part 60 may connected to the front wheel line part 40 so as to guide hydraulic pressure, and the hydraulic brake 70 may be connected to the rear wheel line part 60. The hydraulic brake 70 may brake a rear wheel 170 using hydraulic pressure.

The brake device 1 for a vehicle in accordance with the embodiment of the present invention may further include an accumulator part 80 and a motor pump 90. The accumulator part 80 may accumulate hydraulic pressure to perform a buffer function. The accumulator part 80 may be connected to the diverging line part 30, the front wheel line part 40, and the rear wheel line part 60, and adjust hydraulic pressure passing through the diverging line part 30, the front wheel line part 40, and the rear wheel line part 60. The motor pump 90 may be connected to the front wheel line part 40 so as to supply hydraulic pressure. For example, the motor pump 90 may be driven according to an electric signal, and provide hydraulic pressure to the hydraulic brake 70.

The brake device 1 for a vehicle in accordance with the embodiment of the present invention may further include a pedal simulator 100. The pedal simulator 100 may be connected to the diverging line part 30, and provide a pedal force to the pedal 20. Through the pedal simulator 100, a driver may recognize a pedal feel when stepping on the pedal 20.

The diverging line part 30 in accordance with the embodiment of the present invention may include a diverging supply part 31, a diverging connection part 32, and a normal open valve 33. The diverging line part 30 in accordance with the embodiment of the present invention may further include a diverging storage part 34 and a normal closed valve 35.

The diverging supply part 31 may include a pair of diverging supply parts which are connected to the master cylinder 10 so as to guide hydraulic pressure. For example, the pedal simulator 100 may be connected to the diverging supply part 31.

The diverging connection part 32 may have one end connected to the diverging supply part 31 and the other end connected to the front wheel line part 40. The normal open valve 33 may be mounted on the diverging connection part 32, and open the diverging connection part 32 in a state where no electrical signal is received. On the other hand, the normal open valve 33 receiving an electrical signal may close the diverging connection part 32.

The diverging storage part 34 may have one end connected to the diverging supply part 31 and the other end connected to the accumulator part 80. The normal closed valve 35 may be mounted on the diverging storage part 34, and close the diverging storage part 34 in a state where no electrical signal is received. On the other hand, the normal closed valve 35 receiving an electrical signal may open the diverging storage part 34.

The front wheel line part 40 in accordance with the embodiment of the present invention may include a front wheel guide part 41 and a front wheel valve 42. The front wheel guide part 41 may connect the diverging connection part 32 to the combined brake 50. The front wheel valve 42 may be mounted in the front wheel guide part 41 so as to open/close the front wheel guide part 41. For example, one end of the front wheel guide part 41 may be connected to the normal open valve 33 formed at an end of the diverging connection part 32, and the other end of the front wheel guide part 41 may be connected to the combined brake 50. The front wheel guide part 41 may have a hydraulic pressure sensor mounted therein, the hydraulic pressure sensor serving to measure hydraulic pressure. During four-wheel independent active control, fluid pressure may leak when the hydraulic pressure between the front wheel valve 42 and the combined brake 50 becomes higher than the previous hydraulic pressure of the front wheel valve 42. In order to prevent the leakage, a check valve may be removed from the front wheel valve 42.

The rear wheel line part 60 in accordance with the embodiment of the present invention may include a rear wheel guide part 61, a rear wheel valve 62, a rear wheel bypass part 63, and a check valve 64. The rear wheel guide part 61 may connect the front wheel guide part 41 and the hydraulic brake 70, and the rear wheel valve 62 may be mounted on the rear wheel guide part 61 so as to open/close the rear wheel guide part 61. For example, one end of the rear wheel guide part 61 may be connected to the front wheel guide part 41 between the normal open valve 33 and the front wheel valve 42. The rear wheel bypass part 63 may have both ends connected to the rear wheel guide part 61, and induce hydraulic pressure to bypass the rear wheel valve 62. The check valve 64 may be mounted on the rear wheel bypass part 63, and allow hydraulic pressure to flow only in one direction.

The accumulator part 80 in accordance with the embodiment of the present invention may include an accumulator 81, a pump connection part 82, a diverging connection part 83, a front wheel connection part 84, and a rear wheel connection part 85. The pump connection part 82 may connect the motor pump 90 and the accumulator 81, the diverging connection part 83 may connect the diverging storage part 34 and the accumulator 81, the front wheel connection part 84 may connect the front wheel guide part 41 and the accumulator 81, and the rear wheel connection part 85 may connect the rear wheel guide part 61 and the accumulator 81. The diverging connection part 83 may include a connection check valve 831 which allows hydraulic pressure to flow only in one direction. The front wheel connection part 84 may include a front wheel opening/closing part 841 which opens/closes the front wheel connection part 84, and the rear wheel connection part 85 may include a rear wheel opening/closing part 851 which opens/closes the rear wheel connection part 85.

For example, the pump connection part 82 may have one end connected to the motor pump 90 and the other end connected to the accumulator 81. One end of the diverging connection part 83 may be connected to the normal closed valve 35 formed at the end of the diverging storage part 34, and the other end of the diverging connection part 83 may be connected to the pump connection part 82 formed between the motor pump 90 and the connection check valve 831. One end of the front wheel connection part 84 may be connected to the front wheel guide part 41 formed between the front wheel valve 42 and the combined brake 50, and the other end of the front wheel connection part 84 may be connected to the pump connection part 82 formed between the connection check valve 831 and the accumulator 81. One end of the rear wheel connection part 85 may be connected to the rear wheel guide part 61 formed between the rear wheel bypass part 63 and the hydraulic brake 70, and the other end of the rear wheel connection part 85 may be connected to the front wheel connection part 84 formed between the front wheel opening/closing part 841 and the accumulator 81.

The motor pump 90 in accordance with the embodiment of the present invention may be connected to each of the front wheel guide parts 41. For example, the motor pump 90 may be connected to the front wheel guide part 41 formed between the normal open valve 33 and the front wheel valve 42.

Figure 5:
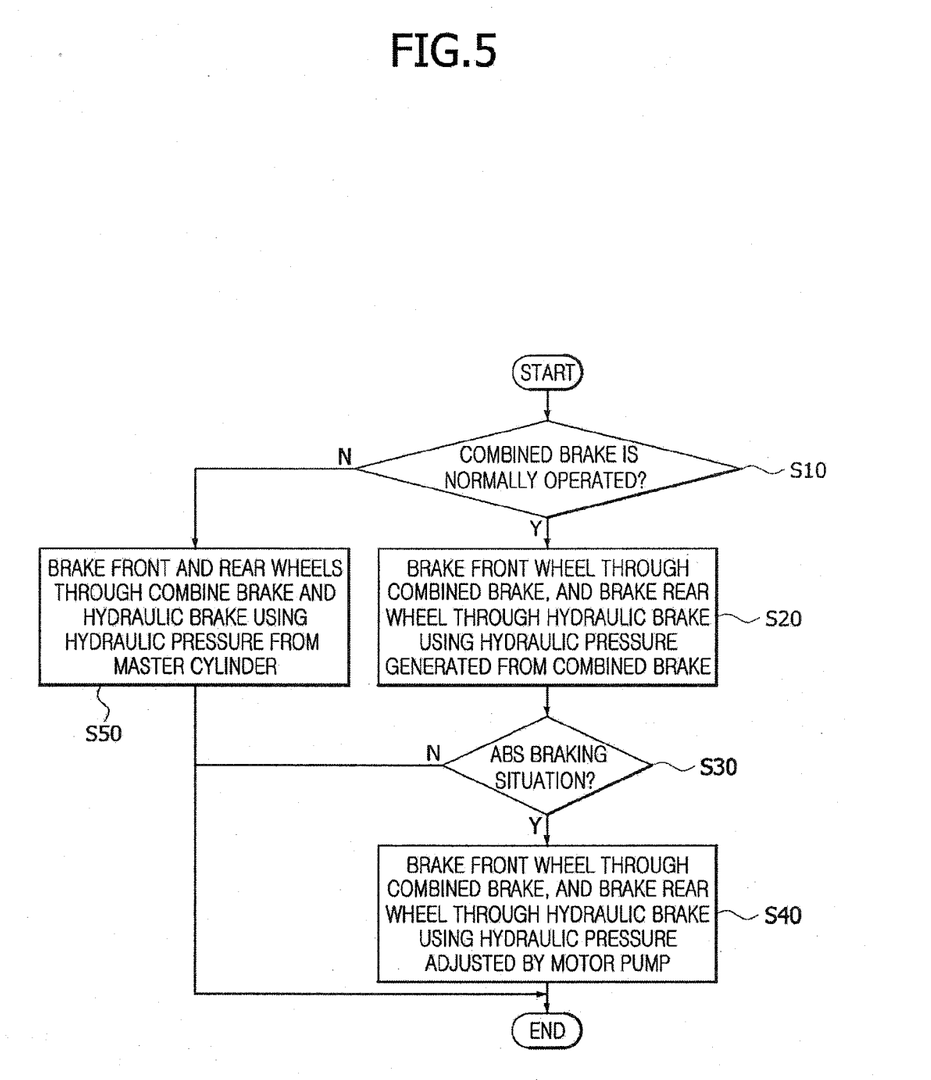
FIG. 5 is a flowchart schematically illustrating a brake method for a vehicle in accordance with an embodiment of the present invention.

FIG. 5 is a flowchart schematically illustrating a brake method for a vehicle in accordance with an embodiment of the present invention. Referring to FIGS. 1 to 5, the brake method for a vehicle in accordance with the embodiment of the present invention will be described as follows. The brake method for a vehicle in accordance with the embodiment of the present invention may indicate a method for controlling a braking operation for the front and rear wheels 150 and 170 in a state where braking is requested, for example, in a state where a driver steps on the pedal 20.

First, a controller may detect whether the combined brake 50 is normally operated, the combined brake serving to brake the front wheels through an electrical signal and hydraulic pressure, at step S10.

When the combined brake 50 is normally operated, the front wheel 150 may be braked by the combined brake 50 receiving the electrical signal, and the rear wheel 170 may be braked by the hydraulic brake 70 using the hydraulic pressure generated from the combined brake 50, at step S20.

For example, when the combined brake 50 is normally operated (refer to FIG. 2), the normal open valve 33 receiving the electrical signal may close the diverging connection part 32, and the normal closed valve 35 may close the diverging storage part 34. Thus, when a driver steps on the pedal 20, the hydraulic pressure generated from the master cylinder 10 may be transferred to the pedal simulator 100 to acquire a pedal force for the pedal 20. At this time, the combined brake 50 receiving the electrical signal may be mechanically driven to brake the front wheel 150. When the combined brake 50 is driven to increase the hydraulic pressure of the front wheel guide part 41, the increased hydraulic pressure may be provided to the hydraulic brake 70 through the rear wheel line part 60. Thus, the hydraulic brake 70 may brake the rear wheel 170.

After the front wheel 150 is braked by the combined brake 50 receiving the electrical signal and the rear wheel 170 is braked by the hydraulic brake 70 using the hydraulic pressure generated from the combined brake 50 at step S20, the controller may detect whether the front wheel 150 and the rear wheel 170 are in an ABS braking situation.

When the front wheel 150 and the rear wheel 170 are in the ABS braking situation, the combined brake 50 receiving the electrical signal may brake the front wheel 150, and the hydraulic brake 70 may control the rear wheel 170 using the hydraulic pressure adjusted through the motor pump 90, at step S40.

For example, when an ABS braking action for the front wheel 150 and the rear wheel 170 is performed (refer to FIG. 3), the front wheel valve 42 receiving an electrical signal may close the front wheel guide part 41, and the rear wheel valve 62 receiving an electrical signal may close the rear wheel guide part 61. When the vehicle is rapidly braked or stopped on a low-friction road, a wheel lock may occur. In this case, the combined brake 50 may actively control the front wheel 150. Furthermore, as the motor pump 90 is driven, hydraulic pressure may be supplied to the hydraulic brake 70 through the rear wheel bypass part 63. Then, the hydraulic brake 70 may actively control the rear wheel 170.

When the combined brake 50 is abnormally operated, the combined brake 50 may brake the front wheel 150 using hydraulic pressure supplied form the master cylinder 10, and the hydraulic brake 70 may brake the rear wheel 170, at step S50.

For example, when an error of the combined brake 50 occurs (refer to FIG. 4) or an electrical error occurs across the entire brake system, control for each valve may be not performed. Thus, the normal open valve 33 may open the diverging connection part 32, and the normal closed valve 35 may close the diverging storage part 34. The front wheel valve 42 may open the front wheel guide part 41, and the rear wheel valve 62 may open the rear wheel guide part 61. Thus, as the hydraulic pressure generated from the master cylinder 10 is supplied to the combined brake 50 and the hydraulic brake 70, an emergency braking action may be performed for the front wheel 150 and the rear wheel 170.

In the brake device and method for a vehicle in accordance with the embodiment of the present invention, the combined brake 50 for braking the front wheel 150 according to an electrical signal and the hydraulic brake 70 for braking the rear wheel 170 using hydraulic pressure may be used together.

The brake device and method for a vehicle in accordance with the embodiment of the present invention may secure a pedal force for the pedal 20 through the pedal simulator 100.

The brake device and method for a vehicle in accordance with the embodiment of the present invention may perform a four-wheel braking action using the hydraulic pressure of the master cylinder 10 during an emergency.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A brake system, comprising:
a brake pedal;
a master cylinder configured for generating hydraulic pressure in response to pressing of the brake pedal;
a plurality of wheel brakes comprising a first wheel brake installed in a first wheel and a second wheel brake installed in a second wheel;
at least one hydraulic line interconnecting among the master cylinder, the first wheel brake and the second wheel brake;
a plurality of valves installed in the at least one hydraulic line and configured to connect or disconnect fluid communication among the master cylinder, the first wheel brake and the second wheel brake via the hydraulic line; and
a controller configured to control operation of, the plurality of wheel brakes and the plurality of valves for braking in a normal operation mode and an abnormal operation mode,
the first wheel brake comprising a mechanical-hydraulic combination brake configured to generate braking force by mechanical operation for braking the first wheel and further configured to operate using hydraulic pressure transferred thereto via the hydraulic line, wherein the mechanical-hydraulic combination brake is further configured to generate hydraulic pressure for applying to the second wheel brake via the at least one hydraulic line when generating the braking force by mechanical operation;
the second wheel brake configured to, operate using the hydraulic pressure applied thereto via the hydraulic line;
wherein in the normal operation mode, the master cylinder is disconnected from the first and second wheel brakes and further the first and second wheel brakes are connected via the at least one hydraulic line such that the hydraulic pressure generated by the first wheel brake is transferred to the second wheel brake for operating the second wheel, brake independent of the hydraulic pressure in the master cylinder,
wherein in the abnormal operation mode, the master cylinder is connected to the first and second wheel brakes such that the hydraulic pressure in the master cylinder is transferred to each of the first and second wheel brakes for braking each of the first and second wheels.

2. The brake system of claim 1, further comprising a pedal simulator connected to the master cylinder and configured to provide a pedal force to the brake pedal.

3. The brake system of claim 1, further comprising:
an accumulator connected to the at least one hydraulic line and configured to accumulate hydraulic pressure.

4. The brake system of claim 1, wherein the plurality of valves comprise:
a normal open valve configured to connect fluid communication between the master cylinder and the first and second wheel brakes in a state where no electrical signal is received.

5. The brake of claim 3, wherein the plurality of valves comprise:
a normal closed valve configured to disconnect fluid communication between the master cylinder and the accumulator in a state where no electrical signal is received.

6. The brake system of claim 1, wherein the first wheel is a front wheel of the vehicle and the second wheel is a rear wheel of the vehicle.

7. The brake system of claim 1, wherein the controller is further configured to control operation of the plurality of wheel brakes and the plurality of valves for braking in an ABS operation mode in addition to the normal operation mode and the abnormal operation mode,
wherein in the ABS operation mode, the master cylinder is disconnected from the first and second wheel brakes and the first wheel brake is disconnected from the second wheel brake such that the hydraulic pressure in the master cylinder is not transferred to the second wheel brake for operating the second wheel brake and further such that the hydraulic pressure generated by the first wheel brake is not transferred to the second wheel brake for operating the second wheel brake.

8. The brake system of claim 7, further comprising an ABS pump connected to the at least one hydraulic line and configured to provide hydraulic pressure to the second wheel brake in the ABS operation mode.

9. The brake system of claim 8, wherein in the ABS operation mode, the first wheel brake is configured to generate its own ABS braking force.

10. A method of operating a brake system, the method comprising:
providing the brake system of claim 1; and
controlling, by the controller, operation of the plurality of wheel brakes and the plurality of valves for braking in a normal operation mode and an abnormal operation mode,
wherein in the normal operation mode, the master cylinder is disconnected from the first and second wheel brakes and further the first and second wheel brakes are connected via the at least one hydraulic line, such that the hydraulic pressure generated by the first wheel brake is transferred to the second wheel brake for operating the second wheel brake independent of the hydraulic pressure in the master cylinder,
wherein in the abnormal operation mode, the master cylinder is connected to the first and second wheel brakes such that the hydraulic pressure in the master cylinder is transferred to each of the first and second wheel brakes for braking each of the first and second wheels.

11. The brake system of claim 1,
wherein the plurality of wheel brakes comprises a third wheel brake installed in a third wheel and a fourth wheel brake installed in a fourth wheel;
the fourth wheel brake configured to operate using the hydraulic pressure applied thereto via the hydraulic line, wherein the fourth wheel brake is not capable of generating braking force by itself;

the at least one hydraulic line further interconnecting among the master cylinder, the third wheel brake and the fourth wheel brake;

the plurality of valves installed in the at least one hydraulic line and configured to connect or disconnect fluid communication among the master cylinder, the third wheel brake and the fourth wheel brake via the hydraulic line; and the third wheel brake comprising a mechanical-hydraulic combination brake configured to generate braking, force by mechanical, operation for braking the third wheel and further configured to operate using hydraulic pressure transferred thereto via the hydraulic line, wherein the mechanical-hydraulic combination brake is further configured to apply hydraulic pressure in the at least one hydraulic line when generating the braking force by mechanical operation;

wherein in the normal operation mode, the master cylinder is disconnected from the third and fourth wheel brakes and further the third and fourth wheel brakes are connected via the at least one hydraulic line such that the hydraulic pressure generated by the third wheel brake is transferred to the fourth wheel brake for operating the fourth wheel brake independent of the hydraulic pressure in the master cylinder, wherein in the abnormal operation mode, the master cylinder is connected to the third and fourth wheel brakes such that the hydraulic pressure in the master cylinder is transferred to each of the third and fourth wheel brakes for braking each of the third and fourth wheels.

* * * * *